United States Patent
Lee et al.

(10) Patent No.: US 6,496,466 B1
(45) Date of Patent: Dec. 17, 2002

(54) FOLDING MIRROR STRUCTURE

(75) Inventors: Hsiao-Wen Lee, Hsinchu (TW); Li-Ding Wei, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/520,394

(22) Filed: Mar. 8, 2000

(30) Foreign Application Priority Data

Jul. 9, 1999  (TW) .......................................... 088111661

(51) Int. Cl.⁷ ................................................. G11B 7/00
(52) U.S. Cl. ................................ 369/112.29; 369/44.23
(58) Field of Search ............................ 369/44.23, 112.29, 369/112.28, 112.21, 112.03; 359/846, 847, 849, 869, 868, 223, 224, 850, 851, 291

(56) References Cited

U.S. PATENT DOCUMENTS

| | | | | |
|---|---|---|---|---|
| 5,550,680 A | * | 8/1996 | Yoon | 359/851 |
| 5,719,846 A | * | 2/1998 | Matoba et al. | 369/112.29 |
| 5,861,979 A | * | 1/1999 | Ji et al. | 359/291 |
| 6,002,661 A | * | 12/1999 | Abe et al. | 369/44.23 |
| 6,052,229 A | * | 4/2000 | Kim | 359/291 |

FOREIGN PATENT DOCUMENTS

GB        2 238 880 A  *  6/1991

* cited by examiner

Primary Examiner—Thang V. Tran
(74) Attorney, Agent, or Firm—J. C. Patents

(57) ABSTRACT

A folding mirror structure comprises a folding mirror, a piezoelectric film and electrodes attached to the surfaces of the piezoelectric film. The folding mirror is used for deflecting a laser beam. The piezoelectric film and electrodes are stacked in an interleaving manner and attached to the folding mirror. The surfaces of the electrodes have particular patterns for compensating the coma aberrations due to the tilt of an optical disc.

12 Claims, 5 Drawing Sheets

FOLDING MIRROR STRUCTURE

CROSS-REFERENCE TO RELATED APPLICATION

This application claims the priority benefit of Taiwan application Ser. No. 88111661, filed Jul. 9, 1999.

BACKGROUND OF THE INVENTION

1. Field of Invention

The present invention relates to a folding mirror. More particularly, the present invention relates to a folding mirror used for a pick-up head of an optical recording/reproducing device.

2. Description of Related Art

Generally speaking, an optical recording/reproducing device can use a optical disc, such as a compact disc-read only memory (CD-ROM) or a digital versatile disc (DVD), to record a large amount of data therein, and can reproduce data stored in the optical disc. As the multimedia technology highly developes, the optical disc capable of storing a large amount of video and audio data is more popular. Furthermore, because of highly developed DVD technology, the capacitance dramatically increases to 4.7 gigabyte (GB) from 650 megabyte (MB) of the traditional CD-ROM disc, and even increases to 15 GB in the feature.

The optical recording/reproducing device has an optical pick-up head used for reading data stored in an optical disc or writing data into an optical disc. A laser beam emitted from a light source passes through an objective lens within the optical pick-up head and then focuses at an optical disc. Therefore, light spots are formed on an information layer of the optical disc. The laser beam is then reflected by the information layer and received by a photo detector. By this, the data stored in the optical disc are read out.

However, as the capacitance and storage density of the optical disc increase, the quality of the spots formed on the information layer is easily affected by the tilt of the optical disc. The deformed sports are usually in an asymmetric coma shape, known as coma aberration. When the coma aberration occurs, the reflected laser beam by the optical disc is burred, which causes signals read by the optical pick-up head to be distorted. Therefore, it is an important subject how to compensate the affection of the coma aberrations due to the tilt of the optical disc and how to improve the quality of the laser beam spots for reading data.

Accordingly, several methods for compensating errors due to the coma aberrations and improving the quality of the laser beam spots are proposed. For example, the U.S. patent (U.S. Pat. No. 5,523,989), issued to Matsushita Corp., Japan, 1996, discloses a disc driver having an additional lens for compensating the coma aberration. When the optical disc tilts, a servo mechanism drives comatic lenses to compensate the coma aberration errors. However, in addition to the comatic lenses, this method needs an actuator to drive the comatic lenses. Therefore, the overall assembly tolerance range for the disc driver becomes tightened.

The Pioneer company utilizes a liquid crystal phase modulator to compensate coma aberration error due to the tilt of the optical disc. The proposed method needs additional driver circuits and special designed driving voltages to modulate phase deviations of different spatial positions to compensate the coma aberration errors. However, this method can not normally function for high-speed disc drivers because the special resolution is limited and the response time of the liquid crystal is slow.

In addition, the U.S. patent (U.S. Pat. No. 5,723,054), issued to Eastman Kodak Corp., U.S., 1998, discloses that sensors are assembled to an actuator for detecting and determining the tilt status of an optical disc. According to a detected disc tilt error signal, a base used for mounting the actuator moves angularly to compensate the coma aberrations. However, a complex mechanism is required to achieve the compensation and the complexity and volume of the whole system increase.

According to the conventional methods discussed above, additional optical compensation lens and/or actuator must be added within the optical path of the pick-up head for compensating the coma aberrations due to the tilt of the optical disc. Therefore, the volume of the pick-up head and the difficulty for assembling the optical pick-up head increase.

SUMMARY OF THE INVENTION

The invention provides a folding mirror device, which can be applied to an optical pick-up head of an optical recording/reproducing device. The folding mirror device comprises a folding mirror, a piezoelectric film and electrodes attached to the surfaces of the piezoelectric film. Accordingly, the present invention does not need to design new additional optical elements or actuators to modify the optical pick-up head. The present invention utilizes the piezoelectric film accompanied with the electrodes having particular patterns and voltages applied to the piezoelectric film to deform surface of the folding mirror attached to the piezoelectric film. Due to the deformation of the folding mirror, the coma aberrations are compensated and therefore the signal quality for reading data from the optical disc is improved.

To achieve these and other advantages and in accordance with the purpose of the invention, as embodied and broadly described herein, the invention provides a folding mirror structure for compensating the coma aberrations. The folding mirror structure comprises a folding mirror for reflecting a laser beam, a piezoelectric film attached to the surface of the folding mirror. The piezoelectric film further comprises electrodes attached to the surfaces of the piezoelectric film, which each of the electrodes has particular pattern thereon.

Accordingly, by properly adjusting the applied external electric field to electrodes attached to the piezoelectric film, the piezoelectric film deforms which causes the folding mirror deforms to be capable of compensating the coma aberrations.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIGS. 6A and 6B respectively show the contour diagram and 3-dimesional plot of the sixth term of the Zernike polynomials;

DESCRIPTION OF THE PREFERRED EMBODIMENTS

Figure 1:
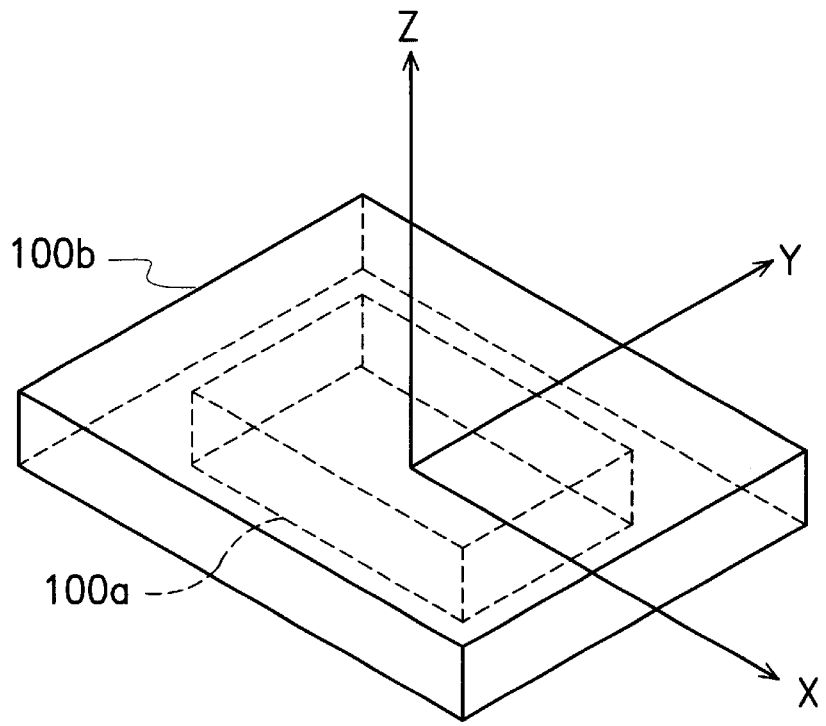
FIG. 1 is schematically illustrates a diagram showing deformation of piezoelectic material subject to an external electric field.

Piezoelectric materials, capable of transferring energy between electrical power and mechanical power, yield mechanical stress thereon to deform themselves when the piezoelectric materials are subject to an external electric field. FIG. 1 schematically illustrates a diagram showing deformation of piezoelectic material subject to an external electric field. A Cartesian coordinate system (x, y, z) is used for explaining the piezoelectric phenomenon. As shown in FIG. 1, a piezoelectric film 100a without subject to the external electric field is depicted by dash line. For example, when an external electric field is applied along the z-axis of the piezoelectric film 100a, the piezoelectric film 100a deforms and extents along x-, y-, and z-axis to form a deformed piezoelectric film 100b. Therefore, if a structure element is attached to a piezoelectric film, the structure element deforms when the piezoelectric film deforms due to an external electric field.

Figure 2A:
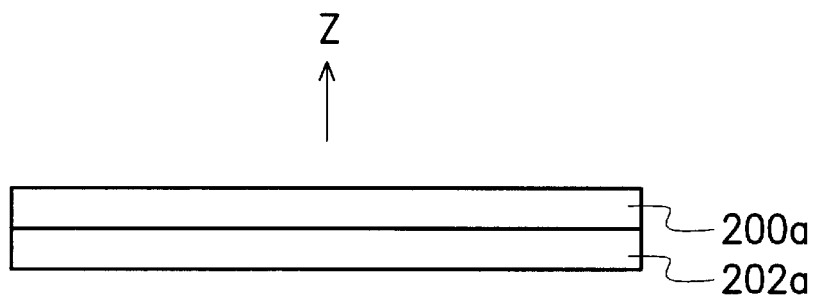
FIGS. 2A and 2B respectively show cross-sectional views that the folding mirror device is not subject to an external electric field and subject to an external electric field, according to one preferred embodiment of the present invention.
Figure 2B:
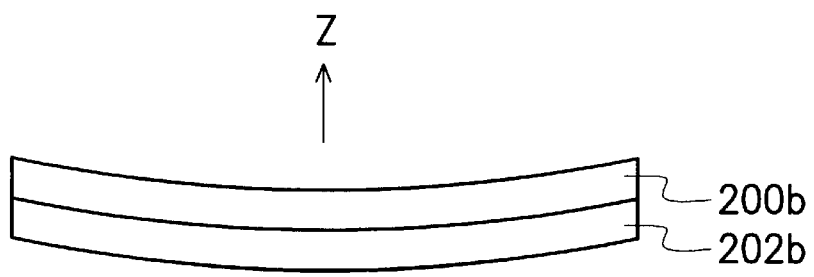

The folding mirror within an optical pick-up head is substantially a plate. Therefore, the concept of the present invention utilizes piezoelectric theory to design and make a folding mirror device. The folding mirror device of the present invention comprises a folding mirror and a piezoelectric film attached to the folding mirror. FIGS. 2A and 2B respectively show cross-sectional views when the folding mirror device is not subjected to and is subject to an external electric field, according to one preferred embodiment of the present invention. Referring to FIG. 2A, a folding mirror 200a is attached to a piezoelectric film 202a. As shown in FIG. 2A, because no external electric field applies to the piezoelectric film 202a, the folding mirror 200a and the piezoelectric film 202a are in status of plate. Namely, the piezoelectric film 202a does not bend the folding mirror 200a.

As shown in FIG. 2B, when an external electric field is applied to the piezoelectric film 202a along z-axis, the piezoelectric film 202a deforms to be a deformed piezoelectric film 202b, which causes the folding mirror 200a to be a deformed folding mirror 200b. For example, the folding mirror 200a and 200b mentioned above can be a glass folding mirror, a reflective mirror or silicon wafer etc., and the piezoelectric film 202a and 202b attached to the surface of the folding mirror 200a and 200b can be a PZT $(PbZr_xTi_{1-x}O_3)$ ceramic film, or a polymer film composed of polyvinylidene fluoride (PVDF).

Figure 3:
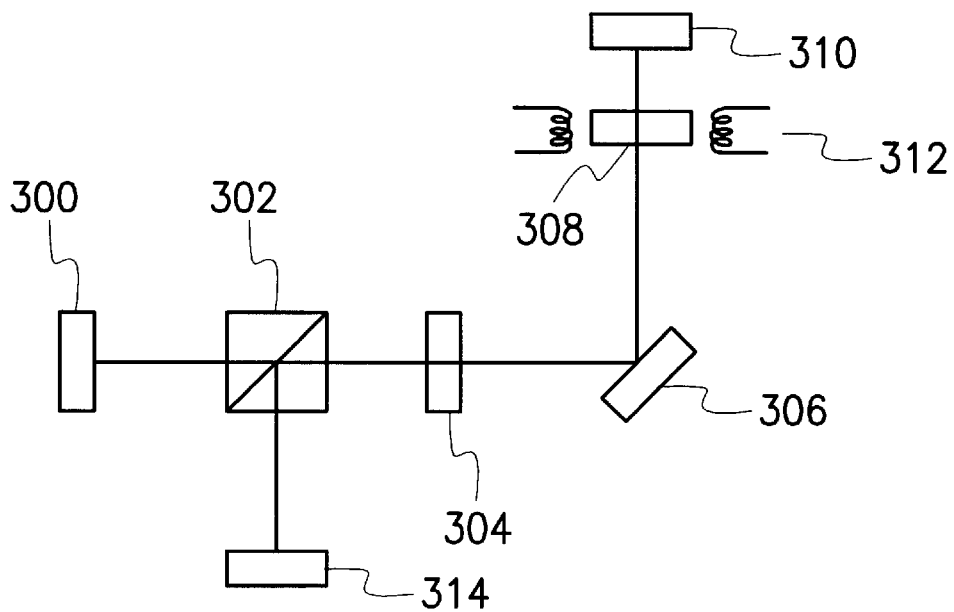
FIG. 3 schematically illustrates the structure of an optical pick-up head according to one preferred embodiment of the present invention.

FIG. 3 schematically illustrates the structure of an optical pick-up head according to one preferred embodiment of the present invention. A laser beam is emitted from a light source 300 and directed to a collimator 304 through a splitter 302. The laser beam is collimated by the collimator 304 and then re-directed its direction by a folding mirror module 306. The re-directed laser beam passes through an objective lens 308 and focuses at an optical disc 310 for reading data from the optical disc 310. The light source 300 can be, for example, a laser diode, which emits a laser beam having wavelength 650 nm or 780 nm. The optical disc 310 can be a CD or DVD compatible disc. In particular, the structure of the folding mirror module 306 is discussed in detail below. The laser beam is then reflected by the optic disc 310. Through the objective lens 308, folding mirror module 306, collimator 304 and the splitter 302, the laser beam is directed to a photo detector 314. In addition, the optical pick-up head further comprises an actuator 312 for focusing and tracking.

Figure 4A:
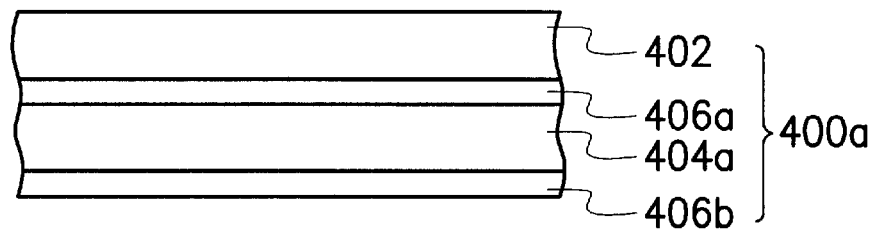
FIG. 4A schematically shows one structure of a folding mirror module structure according to one preferred embodiment of the present invention.

FIG. 4A schematically shows one structure of a folding mirror module structure according to one preferred embodiment of the present invention. The folding mirror module 400a can be used for the folding mirror module 306 shown in FIG. 3. The folding mirror module 400a comprises a folding mirror 402, a first electrode 406a, a piezoelectric plate 404a, and a second electrode 406b. The folding mirror 402 is substantively a plate shape, which can be made of a glass folding mirror, a reflective film or a silicon wafer for example. The first electrode 406a is attached to one surface of the folding mirror 402 and one surface of the piezoelectric plate 404a. The second electrode 406b is then attached to another surface of the piezoelectric plate 404a. Therefore, the piezoelectric plate 404a is attached between the first and second electrode 406a, 406b. The piezoelectric plate 404a can be made of a PZT ceramic film, a PVDF polymer film etc. for example. The first and the second electrodes 406a, 406b can be further connected to an external power supplier for supplying voltage.

Figure 4B:
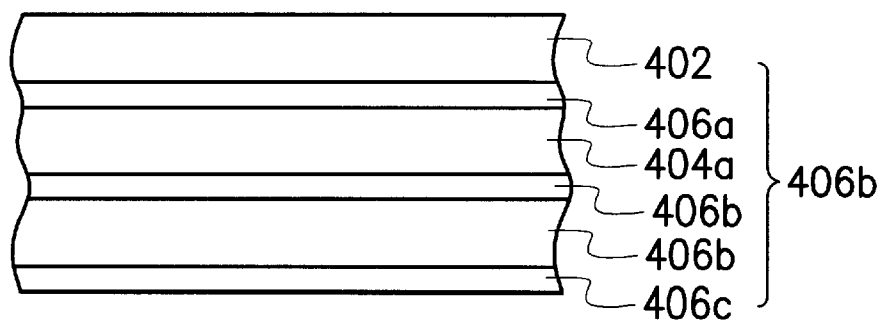
FIG. 4B schematically shows another structure of a folding mirror module structure according to one preferred embodiment of the present invention.

FIG. 4B schematically shows another structure of a folding mirror module structure according to one preferred embodiment of the present invention. The folding mirror module 400b can be also used for the folding mirror module 306 shown in FIG. 3. The folding mirror module 400b comprises a folding mirror 402, a first electrode 406a, a first piezoelectric plate 404a, a second electrode 406b, a second piezoelectric plate 404b and a third electrode 406c. The folding mirror 402 is substantively a plate shape, which can be made of a glass folding mirror, a reflective film or a silicon wafer for example. The first electrode 406a is attached to one surface of the folding mirror 402 and one surface of the first piezoelectric plate 404a. The second electrode 406b, the second piezoelectric plate 404b and the third electrode 406c are attached to the first piezoelectric plate 404a in sequence. The piezoelectric plate 404a can be made of a PZT ceramic film, a PVDF film etc. for example. The first, second and third electrodes 406a, 406b and 406c can be further connected to an external power supplier for supplying voltage.

As shown in FIG. 4B, it should be noticed that the first electrode 406a, the first piezoelectric plate 404a, the second electrode 406b, the second piezoelectric plate 404b and the third electrode 406c are attached to the folding mirror 402 in an interleaving manner. In addition, the structure shown in FIG. 4B is only an example. A number of plates and electrodes can be used in the folding mirror module. The number of the piezoelectric plates and electrodes can be determined by coma aberration effect. Different number of the piezoelectric plates and electrodes, which are attached in an interleaving manner, can compensate different aberration.

Figure 5:
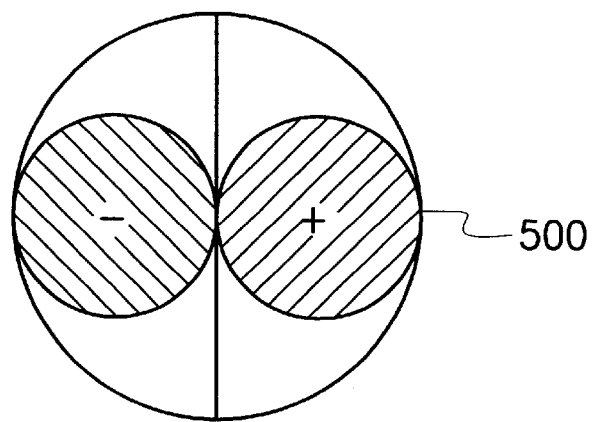
FIG. 5 schematically illustrates a pattern of an electrode attached to a piezoelectric plate according to the present invention.

As discussed above, when a piezoelectric plate is subject to an external voltage, the piezoelectric plate deforms and causes electrodes attached thereon to deform. Therefore, a folding mirror attached to the piezoelectric plate and causes electrodes is deformed. By the deformation of the folding mirror, the coma aberration effect due to the tilt of the optical disc is compensated. FIG. 5 schematically illustrates a pattern of an electrode attached to a piezoelectric plate according to the present invention.

The positive sign (+) represents the positive direction of the poling of the piezoelectric material, and the negative sign (−) represents the negative direction of the poling of the piezoelectric material. For a single electrode attached to the piezoelectric film, only a driving circuit is needed. Therefore, the problem of limited spatial resolution because of discontinuous distribution of electrodes, which is the liquid crystal solution provided by Philip company, can be avoided.

In general, the Zernike polynomials are usually used for analyzing and calculating aberration. The Zernike polynomials are orthogonal complete sets in a unit circuit. Therefore, the folding mirror module is optimized when the folding mirror and the piezoelectric film are circular because superposition principle can accurately be applied. In addition, one or multiple layers of the piezoelectric film can be used to correspond to the same aberration and superposition principle can be applied to compensate a composite coma aberration.

Figure 6A:
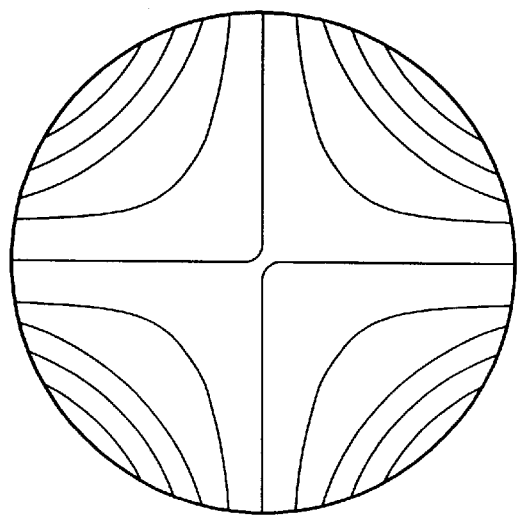
Figure 6A:
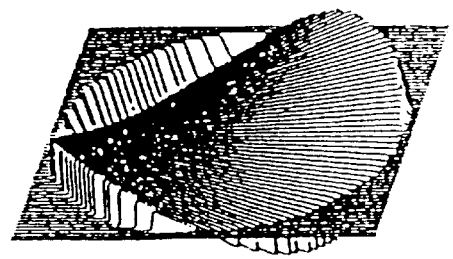
Figure 7A:
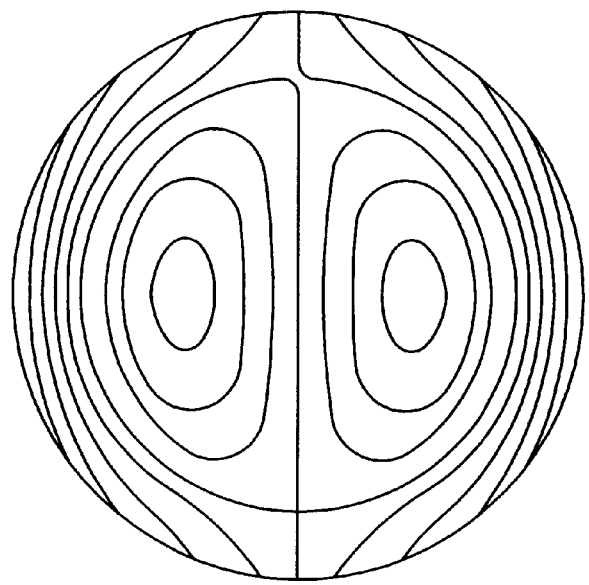
FIGS. 7A and 7B respectively show the contour diagram and 3-dimensional plot of the seventh term of the Zernike polynomials.
Figure 7B:
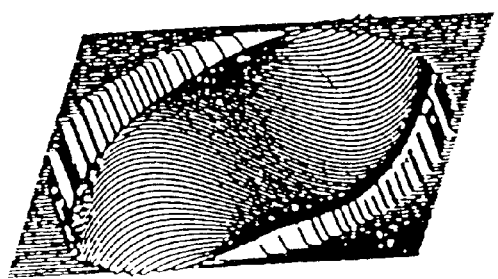
Figure 8:
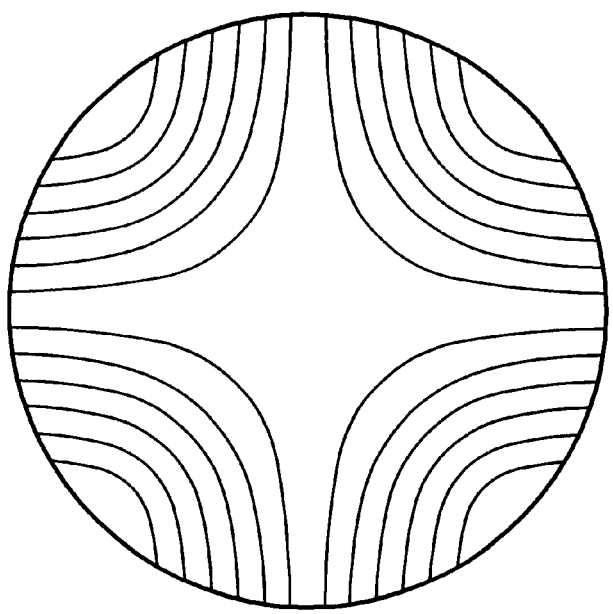
FIG. 8 is a contour diagram of the folding mirror modulated by the applied external electric field according to one preferred embodiment.
Figure 9:
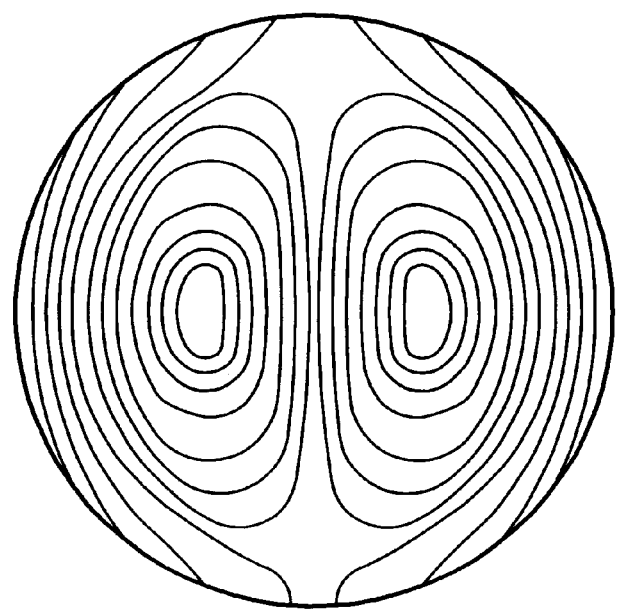
FIG. 9 is another contour diagram of the folding mirror modulated by the applied external electric field according to one preferred embodiment.

FIGS. 6A and 6B respectively show the contour diagram and 3-dimensional plot of the sixth term of the Zernike polynomials and FIGS. 7A and 7B respectively show the contour diagram and 3-dimensional plot of the seventh term of the Zernike polynomials. FIG. 8 is a contour diagram of the folding mirror modulated by the applied external electric field according to one preferred embodiment of the present invention. FIG. 9 is another contour diagram of the folding mirror modulated by the applied external electric field according to one preferred embodiment of the present invention.

Comparing FIGS. 6A and 7A with FIGS. 8 and 9 respectively, when the applied external field is properly adjusted, the piezoelectric film deforms correspondingly to the sixth and seventh terms of the Zernike polynomials, which causes the surface of the folding mirror to deform accordingly and then to compensate the coma aberrations. FIGS. 8 and 9 are obtained by limited element analyzing software, such as I-DEAS™.

As the foregoing discussions, the aberrations due to the tilt of the optical disc are the coma aberrations. In order to compensate the coma aberrations to improve the signal quality, additional optical mechanisms are required during designing the optical path of the pick-up head. The conventional methods for compensating the coma aberrations, such as comatic compensation lenses, liquid crystal phase modulator or actuator base, require additional optical elements or mechanisms to achieve the purposes. However, according to the preferred embodiment, the present invention utilizes the piezoelectric film with designed pattern electrodes to make the surface of the folding mirror to become a deformed surface corresponding to the coma aberrations. By this, the coma aberrations are compensated and this improves the signal quality.

The method for making the folding mirror device can attach one or multiple layers of piezoelectric film to a folding mirror, which the piezoelectric film can be PVDF polymer piezoelectric film or PZT ceramic piezoelectric film. In addition, the folding mirror device can also be made by coating a reflecting film on a piezoelectric film or coating a piezoelectric film on a substrate, such as a silicon wafer or glass.

The folding mirror device of the present invention can have various applications of storage devices, such as optical drivers or magnetic drivers. FIG. 3 shows a typical application that a folding mirror device of the present invention is assembled within a optical pick-up head. In addition, the folding mirror device of the present invention is also suitable for a hologram type micro optical pick-up head or a near-field optical pickup head.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A folding mirror structure, comprising:

a folding mirror;

a first electrode attached to the folding mirror;

a piezoelectric film attached to the first electrode such that the first electrode being located between the folding mirror and the piezoelectric film; and a second electrode attached to the piezoelectric film such that the piezoelectric film being located between the first and the second electrodes, wherein each of the first and the second electrodes has a pattern thereon for generating a 3D contour on the piezoelectric film when an external electric field is applied to the electrodes.

2. The folding mirror structure of claim 1, wherein the piezoelectric film is composed of PZT.

3. The folding mirror structure of claim 1, wherein the piezoelectric film is composed of polyvinylidene fluoride (PUDF).

4. The folding mirror structure of claim 1, wherein the pattern of the first and the second electrodes is designed according to Zernike polynomials.

5. A folding mirror structure, comprising:

a folding mirror; and a plurality of piezoelectric films and a plurality of electrodes attached to the folding mirror, wherein the piezoelectric films and the electrodes are stacked in an interleaving manner, and each of the electrodes has a pattern formed thereon.

6. The folding mirror structure of claim 5, wherein the piezoelectric films are composed of PZT.

7. The folding mirror structure of claim 5, wherein the piezoelectric films are composed of polyvinylidene fluoride (PUDF).

8. The folding mirror structure of claim 5, wherein the pattern of the electrodes is designed according to Zernike polynomials.

9. An optical pick-up head, comprising:

a light source;

a splitter for receiving a beam emitted from the light source and splitting the beam;

a collimator for receiving a beam passing through the splitter;

a folding mirror device for deflecting a beam collimated by the collimator, the folding mirror device further comprising:

> a folding mirror;
>
> a first electrode attached to the folding mirror;
>
> a piezoelectric film attached to the first electrode such that the first electrode being located between the folding mirror and the piezoelectric film, and
>
> a second electrode attached to the piezoelectric film such that the piezoelectric film being located between the first and the second electrodes, wherein each of the first and the second electrodes has a pattern thereon for generating a 3D contour on the piezoelectric film when an external electric field is applied to the electrodes;

an objective lens for focusing a beam deflected by the folding mirror device at an optical disc; and a photo detector for detecting a beam which being reflected by the optical disc and passing through the objective lens, the folding mirror device, the collimator and then reflected by the splitter.

10. The optical pick-up head claim 9, wherein the piezoelectric film is composed of PZT.

11. The optical pick-up head of claim 9, wherein the piezoelectric film is composed of polyvinylidene fluoride.

12. The optical pick-up head of claim 9, wherein the pattern of the electrodes is designed according to Zernike polynomials.

* * * * *